United States Patent
Ash et al.

(10) Patent No.: US 9,658,798 B2
(45) Date of Patent: *May 23, 2017

(54) GROUPING OF TRACKS FOR COPY SOURCE TO TARGET DESTAGE ON GLOBAL MIRROR SECONDARY

(71) Applicant: INTERNATIONAL BUSINESS MACHINES CORPORATION, Armonk, NY (US)

(72) Inventors: Kevin J. Ash, Tucson, AZ (US); Lokesh M. Gupta, Tucson, AZ (US); Theodore T. Harris, Jr., Tucson, AZ (US); Suguang Li, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/185,679

(22) Filed: Jun. 17, 2016

(65) Prior Publication Data

US 2016/0299694 A1    Oct. 13, 2016

Related U.S. Application Data

(63) Continuation of application No. 14/204,928, filed on Mar. 11, 2014, now Pat. No. 9,395,925.

(51) Int. Cl.
*G06F 3/06* (2006.01)

(52) U.S. Cl.
CPC .............. *G06F 3/065* (2013.01); *G06F 3/067* (2013.01); *G06F 3/0619* (2013.01); *G06F 3/0665* (2013.01); *G06F 3/0689* (2013.01)

(58) Field of Classification Search
CPC ......... G06F 3/065; G06F 3/0619; G06F 3/067
See application file for complete search history.

(56) References Cited

U.S. PATENT DOCUMENTS

| 8,549,225 B2 | 10/2013 | Blinick et al. |
| 2013/0024628 A1 | 1/2013 | Benhase et al. |
| 2013/0205094 A1 | 8/2013 | Benhase et al. |

*Primary Examiner* — Eric S Cardwell
(74) *Attorney, Agent, or Firm* — Griffiths & Seaton PLLC

(57) ABSTRACT

For performing efficient full-stride copy source-to-target operations in a computing storage environment by a processor device, pursuant to a destage operation, a determination is made whether to destage a full stride or one track of data on a target volume by comparing a counted number of modified tracks for the full stride against a predetermined threshold.

12 Claims, 5 Drawing Sheets

GROUPING OF TRACKS FOR COPY SOURCE TO TARGET DESTAGE ON GLOBAL MIRROR SECONDARY

CROSS-REFERENCE TO RELATED APPLICATIONS

This application is a Continuation of U.S. patent application Ser. No. 14/204,928, filed on Mar. 11, 2014, the contents of which are incorporated herein by reference.

BACKGROUND OF THE INVENTION

Field of the Invention

The present invention relates in general computing systems, and more particularly to, systems and methods for performing efficient copy source-to-target destage operations in a computing environment.

Description of the Related Art

In today's society, computer systems are commonplace. Computer systems may be found in the workplace, at home, or at school. Computer systems may include data storage systems, or disk storage systems, to process and store data. Contemporary computer storage systems are known to destage storage tracks from cache to long-term storage devices so that there is sufficient room in the cache for data to be written. When destaging the storage tracks, contemporary storage systems destage the storage tracks from each rank in the cache when the cache is becoming full or the global pressure factor is high. That is, storage tracks are destaged from each rank when the global pressure factor is high, even though some ranks in the cache may only be storing a small number of storage tracks with respect to the amount of storage space allocated to these ranks. Moreover, destaging tasks assist with starting the destaging of storage tracks to the storage systems. Also, disasters caused by environmental conditions, user errors, or application errors may occur in which access to the data is lost for some period of time. Mirroring or copying data to a secondary storage system from a primary storage system is currently employed to minimize the time in which access to data is lost due to a disaster. Efficiently destaging, storing, and/or mirroring data to a secondary storage system from a primary storage system is a key problem to solve, and therefore, a need exists to improve the destaging, storage, and management of data in a data storage system.

SUMMARY OF THE INVENTION

In one embodiment, by way of example only, a method is provided for performing efficient full-stride copy source-to-target operations in a computing storage environment by a processor device. For a destage operation, a determination is made whether to destage a full stride or one track of data on a target volume a by comparing a counted number of modified tracks for the full stride against a predetermined threshold.

In another embodiment, again by way of example only, a computer system is provided for performing efficient full-stride copy source-to-target operations by at least one processor device, in a computing environment. The computer system includes a computer-readable medium and a processor in operable communication with the computer-readable medium. For a destage operation, the at least one processor device makes a determination whether to destage a full stride or one track of data on a target volume by comparing a counted number of modified tracks for the full stride against a predetermined threshold.

In a further embodiment, again by way of example only, a computer program product is provided for performing efficient full-stride copy source-to-target operations using at least one processor device, in a computing environment. The computer-readable storage medium has computer-readable program code portions stored thereon. The computer-readable program code portions include a first executable portion that, for a destage operation, determines whether to destage a full stride or one track of data on a target volume by comparing a counted number of modified tracks for the full stride against a predetermined threshold.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
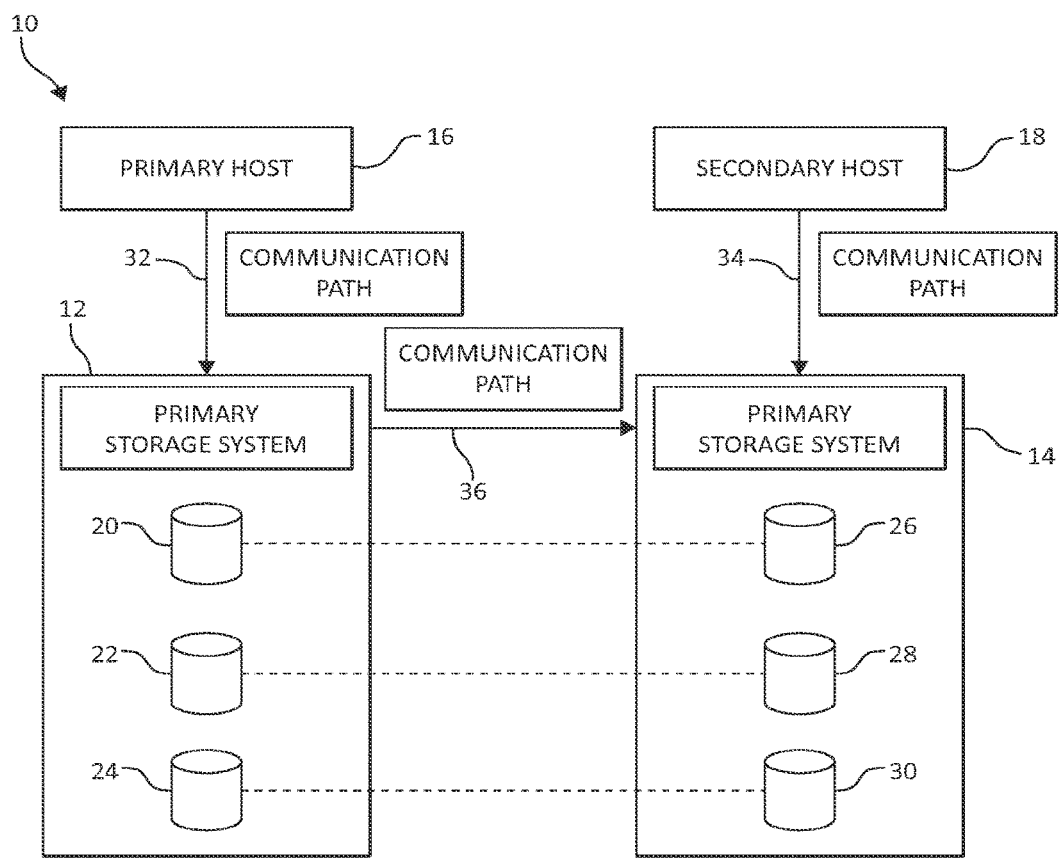
FIG. 1 illustrates is a block diagram showing an exemplary hardware structure for a peer-to-peer remote copy (PPRC) system in which aspects of the present invention may be realized.

With increasingly large amounts of data being handled in data processing systems, storage systems, such as disk storage systems are being used to store data. Some organizations rely heavily on data and quick access to the data. Disasters caused by environmental conditions, user errors, or application errors may occur in which access to the data is lost for some period of time. Mirroring or copying data to a secondary storage system from a primary storage system is currently employed to minimize the time in which access to data is lost due to a disaster. A peer-to-peer remote copy (PPRC) system is a hardware-based disaster recovery solution designed to maintain a mirror image of application data at a remote secondary location. The PPRC system is a synchronous copy mechanism that creates a copy of data at a remote or secondary storage system. This copy, at the secondary storage system, is kept current with the data located at the primary storage system. Particularly, key to PPRC, is the migration of data sets from mass storage devices, such as hard disk drives or other data storage media, to another set with a minimum of disruption to the applications using the data. Particularly, PPRC mechanisms automatically copy changes that are made to a source (primary) volume to a target (secondary) volume until the PPRC relationship is suspended or terminated. In other words, a copy of the data located at the secondary storage system is kept in sync with the data at the primary storage system as observed by the user of the data. Volume pairs are designated in which a volume in the primary storage system is paired with a volume in the secondary storage system.

With a PPRC system, a PPRC data copy to the recovery or secondary storage system occurs synchronously from the primary host point of view with write operations to volumes in the primary storage system. Paths connect the primary storage system to the secondary storage system. When data is written from a primary host to the primary storage system, the data written to a primary volume is also written by the primary storage system to a corresponding volume in the secondary storage system using a path to the secondary storage system.

In effect, the primary volume data is replicated to a corresponding secondary volume and the two volumes are kept in sync when writes are sent to the primary volume. It is the responsibility of the primary storage system to send all primary volume writes to the corresponding secondary volume of the secondary storage system. It is the responsibility of the secondary storage system to disallow any read or write accesses by any hosts to the secondary volume while the secondary volume is dedicated as secondary storage. These actions keep the content of the primary and secondary volumes identical.

In some data storage architectures, data from the secondary storage is copied, by such mechanisms as IBM® FlashCopy, from the secondary volume to a tertiary volume. Consider the following example. Data from a first Volume A may first undergo an asynchronous PPRC operation or Global Copy operation from Volume A in a first location to a second location with a Volume B. The data is then copied using FlashCopy to a Volume C (e.g., data is destaged from Volume B and then sent to Volume C). Currently, during the example described, each track from Volume A to Volume B is sent with a sequential bit associated with the data as set. As a result, every track of the data replicated to Volume B has a corresponding sequential bit set.

In view of the foregoing, on a destage operation of data of a particular track on Volume B, a copy source-to-target operation may be required, since Volume B utilizes FlashCopy to replicate to Volume C. The Copy source-to-target operation is needed if the particular track on disk on Volume B is part of the FlashCopy operation from Volume B to Volume C.

When a sequential bit is set on a track, then a corresponding copy source-to-target operation is performed for the full stride of tracks from Volume B to Volume C. However, the particular destage operation on the source Volume B may only be being performed for a single track, for example, if there are no modified tracks in cache for that particular stride for Volume B. As a result, a single destage operation on Volume B typically causes a full stride stage from Volume B, and a full stride destage from Volume B to Volume C. Accordingly, for random write workloads, disk activity is high for copy source-to-target operations, and may, for example, cause host input/output (I/O) to slow down.

Notwithstanding the current state of affairs as described above, a full stride copy source-to-target operation may actually be unnecessary, since some replication mechanisms such as IBM® Global Mirror will re-flash after a consistency group is formed.

In view of the foregoing, a more efficient process is needed in situations where data is replicated using such mechanisms as copy source-to-target, asynchronous PPRC, and FlashCopy in computing storage environments.

The mechanisms of the illustrated embodiments allow, for example, for performing efficient full-stride copy source-to-target operations in a computing storage environment by a processor device. In one exemplary embodiment, for a destage operation, a determination is made whether to destage a full stride or one track of data by comparing a counted number of modified tracks for the full stride against a predetermined threshold. More particularly, a number of modified tracks may be counted in cache for a certain source stride. If the number of modified tracks in cache exceed a certain threshold, a full stride copy source-to-target (CST) operation is then performed from source to target. Otherwise, the CST is only performed for a particular track.

The following terminology associated with aspects of the present invention may be helpful. A "track" may, for example, refer to herein as a storage unit of a certain size. For example, a track may incorporate 17, 4K segments. A "stride" may, for example, refer to herein as a group of tracks for which a particular redundant array of independent disks (RAID) array generates a parity. For example, a 6+P RAID-5 array stride is 24 tracks.

Continuing the foregoing, a Global Mirror function provides an asynchronous copy process. When a host writes to the primary volume, confirmation of I/O completion is received before the write operation has completed for the copy of the secondary volume. Global Mirror is based on IBM® Copy Services functions: so-called Global Copy and FlashCopy. Global Mirror periodically pauses updates of the primary volumes and swaps change recording bitmaps. Global Mirror then uses the previous bitmap to drain updates from the primary volumes to the secondary volumes. After all primary updates have been drained, the secondary volumes are used as the source for a FlashCopy to tertiary volumes at the recovery site. This ensures that the tertiary copy of the volumes has point-in-time consistency.

As previously mentioned, "CST" may refer to herein as a copy source-to-target operation, a mechanism, for example to copy a source track to all of its targets. Finally, a "flash copy relation/relationship" may refer to herein as a logical copy of data from a source extent to a target extent.

Turning to FIG. 1, a block diagram of one embodiment of a system 10 for FIG. 1 for a peer-to-peer remote copy (PPRC) system in which aspects of the present invention may be realized. At least in the illustrated embodiment, peer remote copy (PPRC) system 10 is shown. PPRC system 10 includes a primary storage system 12 and a secondary storage system 14. PPRC system further includes a primary host 16 connected to primary storage system 12 and a secondary host 18 connected to secondary storage system 14. Primary host 16 stores data in primary storage system 12. Data written to primary storage system 12 is copied to secondary storage system 14. The copy process creates a copy of the data from primary storage system 12 into secondary storage system 14. The copy process is a PPRC mechanism. In PPRC system 10, a write made by primary host 16 is considered complete only after the data written to primary storage system 12 also is written to secondary storage system 14. Primary and secondary hosts 16 and 18 may take various forms, such as a server on a network, a Web server on the Internet, or a mainframe computer. Primary storage system 12 and secondary storage system 14 are disk systems in these examples.

A communication path 32 connects primary host 16 to primary storage system 12. A communication path 34 connects secondary host 18 to secondary storage system 14. A communication path 36 connects primary storage system 12 with secondary storage system 14. Communication paths 32, 34, and 36 may take various forms, such as, for example, a local area network (LAN), a wide area network (WAN), the Internet, or an intranet. Communication paths 32, 34, and 36 contain various links, such as, for example, fiber optic lines, packet switched communication links, enterprise systems connection (ESCON) fibers, small computer system interface (SCSI) cable, and wireless communication links.

PPRC system 10 is an example of a data processing system in which the present invention may be implemented and not as an architectural limitation to the present invention. For example, primary host 16 and primary storage system 12 may be connected directly while primary storage system 12 and secondary storage system 14 may be connected by a LAN or a WAN. Further, primary storage system 12 and secondary storage system 14 may be connected to each other by a network rather than a direct connection.

Primary storage system 12 includes a set of storage volumes 20, 22, and 24. Secondary storage system 14 includes a set of storage volumes 26, 28, and 30. Secondary storage volumes 26, 28, and 30 correspond to primary storage volumes 20, 22, and 24. The correspondence between the volumes in primary and secondary storage systems 12 and 14 is set up in PPRC pairs, such that a storage volume in primary storage system 12 has a corresponding storage volume in secondary storage system 14. For instance, primary volume 20 is paired with secondary volume 26, primary volume 22 is paired with secondary volume 28, and primary volume 24 is paired with secondary volume 30. These pairs are referred to as established PPRC pairs.

In operation, primary storage system 12 sends data over communication path 36 to secondary storage system 14 each time data is written to a primary storage volume by primary host 16. Secondary storage system 14 then copies the data to the secondary storage volume corresponding to the primary storage volume. For example, if data is written to primary storage volume 20 then the data is copied to the corresponding secondary storage volume 26. Similarly, if data is written to primary storage volume 22 then the data is copied to the corresponding secondary storage volume 28.

Figure 2:
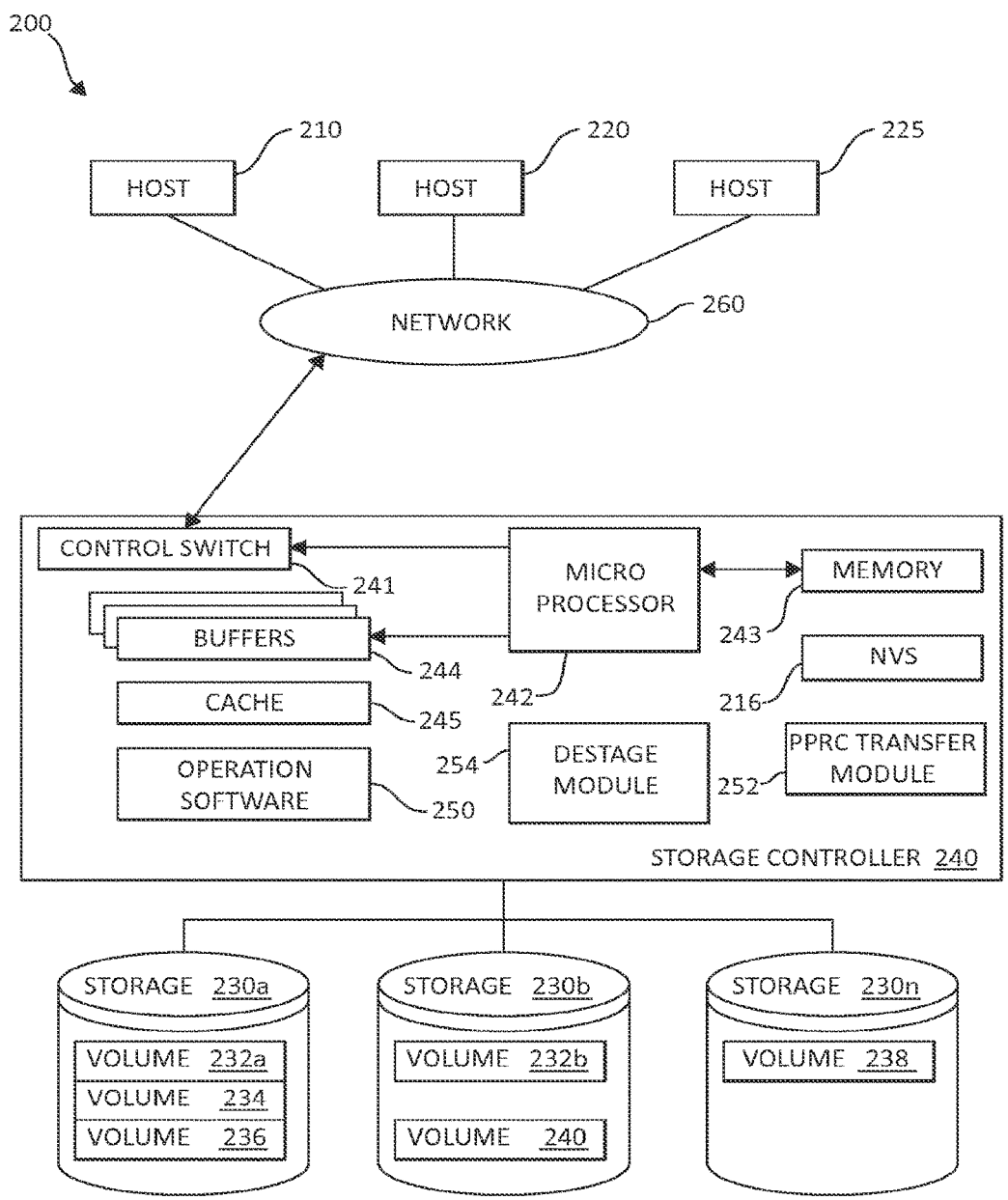
FIG. 2 is a block diagram showing an exemplary hardware structure of a data storage system in a computer system according to the present invention in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230. In one embodiment, the embodiments described herein may be applicable to a variety of types of computing architectures, such as in a virtual cluster management environment using the various embodiments as described herein.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores the operation software 250, program instructions and data, which the processor 242 may access for executing functions and method steps associated with managing storage 230, and executing the steps and methods of the present invention. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a PPRC transfer module 252 and destage module 254. The PPRC transfer module 252 and destage module 254 may be one complete module functioning simultaneously or separate modules. The PPRC transfer module 252 and destage module 254 may have some internal memory (not shown) and may store unprocessed, processed, or "semi-processed" data. In addition, the PPRC transfer module 252 and destage module 254 may work in conjunction with each and every component of the storage controller 240, the hosts 210, 220, 225, and other storage controllers 240 and hosts 210, 220, and 225 that may be remotely connected via the storage fabric 260. The PPRC transfer module 252 and destage module 254 may also be located in the cache 245 or other components of the storage controller 240.

PPRC transfer module 252 and destage module 254 may, in one embodiment, implement various mechanisms as will be further described to effect aspects of the present invention. For example, the destage module 254 may perform such functionality as determining if a particular volume selected for destage is associated with an asynchronous PPRC secondary volume. In addition, for example, the PPRC transfer module 252 may count a number of tracks modified in cache for a particular stride, and compare those tracks against a particular threshold. As one of ordinary skill in the art will appreciate, the destage module 254, PPRC transfer module 252, or another component may be utilized to perform various aspects of the illustrated embodiments as will be further described.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, a control switch 241 for controlling a protocol to control data transfer to or from the free space management module 255, the PPRC transfer module 257, the PPRC modified sectors bitmap module 259, the asynchronous cleanup module 261, the list(s) module 263, the bind segments/slot(s) module 265, the counter module 267, and the hash table module 269 in which information may be set. Multiple buffers 244 may be implemented to assist with the methods and steps as described herein.

In one embodiment, the host computers or one or more physical or virtual devices, 210, 220, 225 and the storage controller 240 are connected through a network adaptor (this could be a fibre channel) 260 as an interface i.e., via a switch called "fabric." The microprocessor 242 may control the memory 243 to store command information from the cluster host/node device (physical or virtual) 210 and information for identifying the cluster host/node device (physical or virtual) 210. The control switch 241, the buffers 244, the cache 245, the operating software 250, the microprocessor 242, memory 243, NVS 216, the free space management module 255, the PPRC transfer module 257, the PPRC modified sectors bitmap module 259, the asynchronous cleanup module 261, the list(s) module 263, the bind segments/slot(s) module 265, the counter module 267, and the hash table module 269 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

Figure 3:
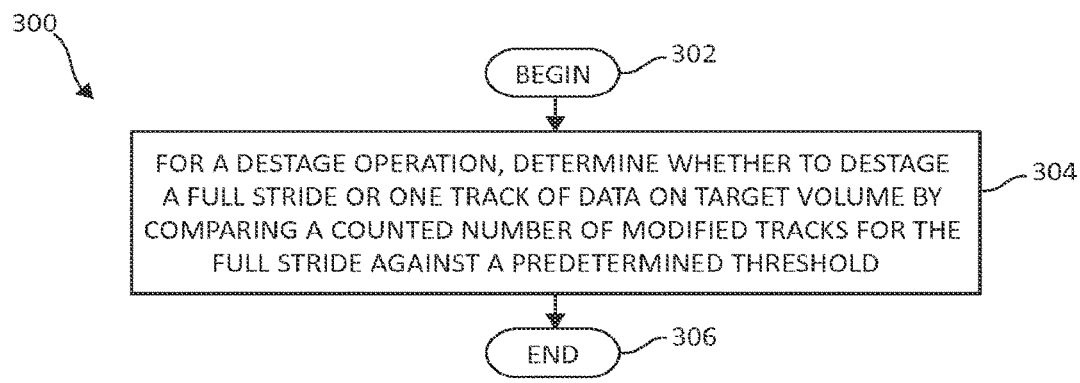
FIG. 3 is a flowchart diagram illustrating an exemplary method for performing efficient full-stride copy source-to-target operations, in which aspects of the present invention may be realized.

Turning to FIG. 3, a flowchart diagram illustrating an exemplary method 300 for performing efficient full-stride copy source-to-target operations in a computing storage environment. Method 300 begins (step 302) with a determination of whether to destage a full stride or one track of data on a target volume by comparing a counted number of tracks for the full stride against a predetermined threshold (step 304). The method then ends (step 306).

Method 300 as described may be more particularly illustrated by the following functionality that may be performed pursuant to one of the illustrated embodiments. As a first step, destage task control blocks (TCBs) move through a B-tree using a sorted list in the order of the track numbers as the TCBs select a stride for destage. Once a stride is selected for destage, the destage TCBs determine if the associated volume is an asynchronous PPRC secondary. If so, the destage TCB may count the number of tracks modified in cache for that stride. If the counted number is greater than a predetermined threshold (e.g., 25%) of the stride size, then the destage TCB may mark the first track in the stride to be sequential. Otherwise, the sequential bit in the track is reset.

As a following step the destage TCB may call Copy Services with the first track in the stride present in cache and modified. Copy Services may then check if the sequential bit is set. If the sequential bit is set, then a full stride CST may then be performed (i.e., a stage of a full stride from the source is performed, and a full stride is destaged to the target). If the sequential bit is not set, then the CST is performed for just that track.

Figure 4:
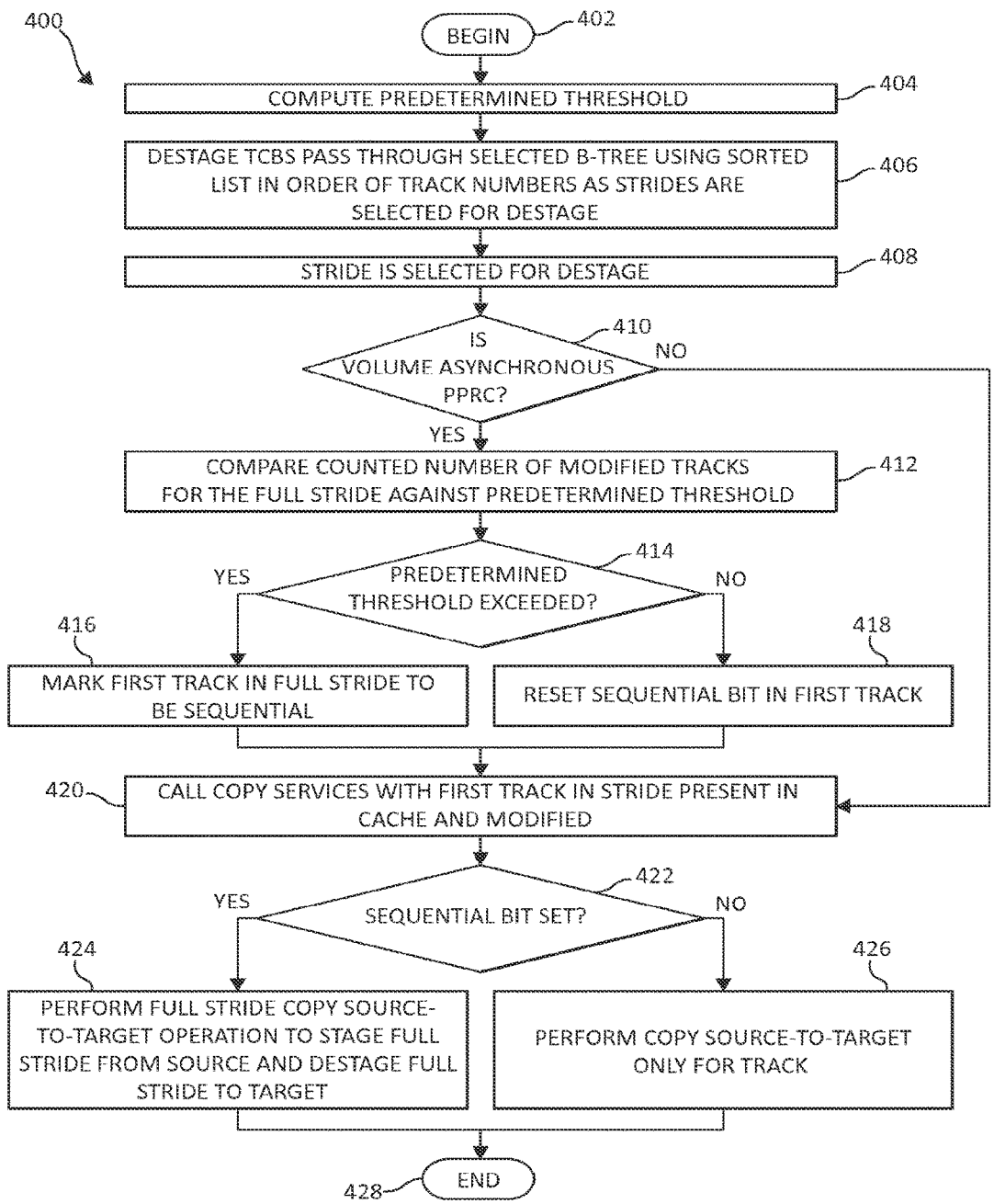
FIG. 4 is a flowchart diagram illustrating an additional method for performing efficient full-stride copy source-to-target operations, again in which aspects of the present invention may be realized.

Turning now to FIG. 4, an exemplary method 400 for performing efficient copy services operations in view of the previous discussion is described. Method 400 begins (step 402) by computing a predetermined threshold of a stride size (step 404). An example of arriving at the predetermined threshold is described in FIG. 5, following.

In step 406, the destage TCBs pass through the selected B-tree using the sorted list in order of track numbers as strides are selected for destage, and a particular stride is selected (step 408). If the secondary volume is determined to be an asynchronous PPRC relationship with the primary (step 410), the number of modified tracks for the full stride to be copied is compared against the predetermined threshold (step 412). If the predetermined threshold is exceeded (step 414), the first track in the full stride is marked to be sequential (step 416). Alternatively, the sequential bit in the first track is reset (step 418). Returning to step 410, if the secondary volume is determined not to be an asynchronous PPRC relation, the method continues to step 420.

In the following step 420, the appropriate copy services (replication) operation is then called with the first track in stride present in cache and modified. If the sequential bit is set (step 422), then a full stride CST operation is performed to stage the full stride from the source and destage the full stride to the target (step 424). Alternatively, the CST operation is performed only for the track (step 426). The method 400 then ends (step 428).

The predetermined threshold for the particular stride size in question described previously may, as one of ordinary skill in the art, be determined in a variety of ways. Consider the following example. First, a computation for a number of disk operations for a full stride CST in the corresponding RAID array may be performed. For a 6+p RAID 5 array, a full stride CST will require 6 disk operations to stage a full stride from the source volume and 7 disk operations to destage (6 for destage of data and 1 for destage of parity).

Second, a computation for a number of disk operations for one track CST in the RAID array may be performed. So, for example, for a 6+p RAID 5 array, a CST of one track will require 4 disk operations (stage of the track from source, stage of the parity from target, destage of track and destage of parity on target).

Continuing the foregoing example, the percentage threshold may then be defined as (a number of disk operations for the one track CST*100), divided by (the number of disk operations for the full stride CST) plus a "fudge factor" (i.e., ad hoc quantity) added for excess bandwidth usage for a full stride stage/destage.

Using the definition above, including the ad hoc quantity, a threshold for the 6+p RAIDS array is (4*100)/24+10, which equals approximately 25%.

Figure 5:
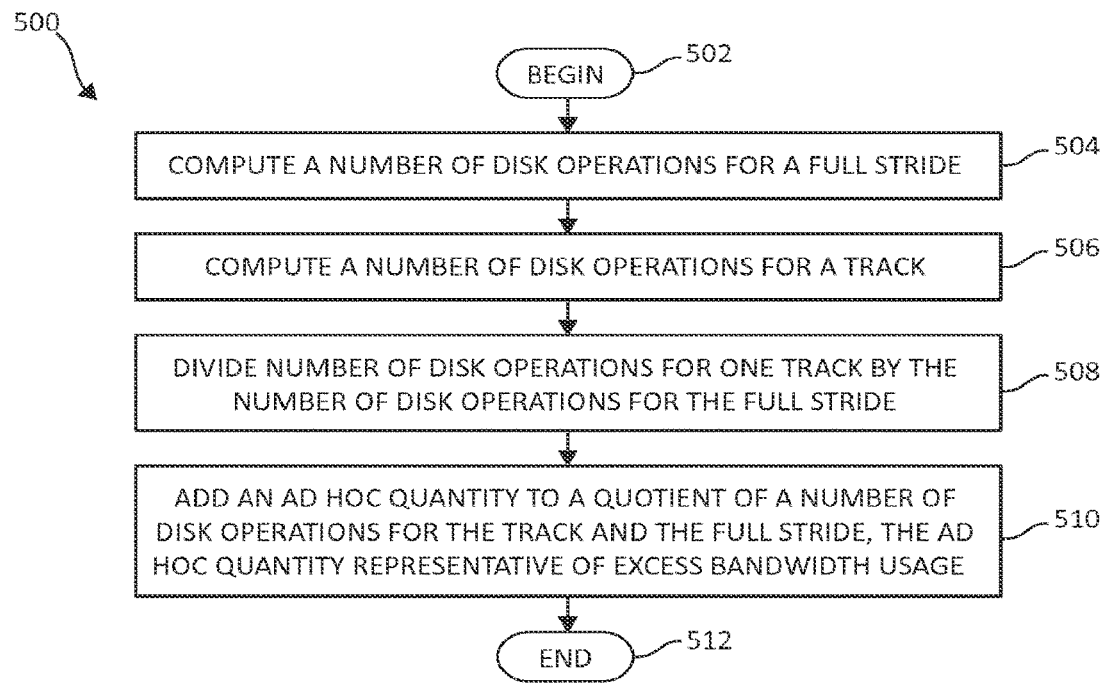
FIG. 5 is a flowchart diagram illustrating an exemplary method for determining a threshold to be used in performing full-stride copy source-to-target operations, here again in which aspects of the present invention may be realized.

FIG. 5, following, is a flowchart diagram illustrating an exemplary method 500 for defining a threshold in which aspects of the present invention may be implemented. Method 500 begins (step 502) with the computation of a number of disk operations for a full stride (e.g., CST operation in the RAID array) (step 504). As a following step, a number of disk operations for a track (e.g., CST operation in the RAID array) are computed (step 506). The number of disk operations for the track is divided by the number of disk operations for the full stride (step 508). An ad hoc quantity to the quotient is added, representative of excess bandwidth usage (step 510). The method 500 then ends (step 512).

As will be appreciated by one skilled in the art, aspects of the present invention may be embodied as a system, method or computer program product. Accordingly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, fieldprogrammable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for performing efficient full-stride copy source-to-target operations in a computing storage environment by a processor device, comprising:

for a destage operation, determining whether to destage a full stride or one track of data on a target volume by comparing a counted number of modified tracks for the full stride against a predetermined threshold;

defining the predetermined threshold by computing a number of disk operations for the full stride, computing a number of disk operations for the one track, and dividing the number of disk operations for the full stride by the number of disk operations for the one track; and determining if the destage operation is for an asynchronous Peer-to-Peer Redundant Copy (PPRC) operation.

2. The method of claim 1, wherein defining the predetermined threshold includes adding an ad hoc quantity to a quotient of the number of disk operations for the one track and the full stride, the ad hoc quantity representative of excess bandwidth usage.

3. The method of claim 1, wherein the one track is the first track in the full stride, and further including, if the predetermined threshold is exceeded, marking the first track in the full stride to be sequential; otherwise resetting a sequential bit in the first track.

4. The method of claim 3, wherein if the first track is marked to be sequential, performing a full stride copy source-to-target operation; otherwise performing a copy source-to-target operation for the first track.

5. A system for performing efficient full-stride copy source-to-target operations in a computing storage environment, the system comprising:

at least one processor device operable in the computing environment, wherein the processor device:

for a destage operation, determines whether to destage a full stride or one track of data on a target volume by comparing a counted number of modified tracks for the full stride against a predetermined threshold, defines the predetermined threshold by computing a number of disk operations for the full stride, computing a number of disk operations for the one track, and dividing the number of disk operations for the full stride by the number of disk operations for the one track, and determines if the destage operation is for an asynchronous Peer-to-Peer Redundant Copy (PPRC) operation.

6. The system of claim 5, wherein the at least one processor device, pursuant to defining the predetermined threshold, adds an ad hoc quantity to a quotient of the number of disk operations for the one track and the full stride, the ad hoc quantity representative of excess bandwidth usage.

7. The system of claim 5, wherein the one track is the first track in the full stride, and further wherein the at least one processor device, if the predetermined threshold is exceeded, marks the first track in the full stride to be sequential; otherwise resets a sequential bit in the first track.

8. The system of claim 7, wherein if the first track is marked to be sequential, the at least one processor device performs a full stride copy source-to-target operation; otherwise the at least one processor device performs a copy source-to-target operation for the first track.

9. A computer program product for performing efficient full-stride copy source-to-target operations in a computing storage environment by a processor device, the computer program product comprising a non-transitory computer-readable storage medium having computer-readable program code portions stored therein, the computer-readable program code portions comprising:

an executable portion that, for a destage operation, determines whether to destage a full stride or one track of data on a target volume by comparing a counted number of modified tracks for the full stride against a predetermined threshold;

an executable portion that defines the predetermined threshold by computing a number of disk operations for the full stride, computing a number of disk operations for the one track, and dividing the number of disk operations for the full stride by the number of disk operations for the one track; and an executable portion that determines if the destage operation is for an asynchronous Peer-to-Peer Redundant Copy (PPRC) operation.

10. The computer program product of claim 9, further including an executable portion that, pursuant to defining the predetermined threshold, adds an ad hoc quantity to a quotient of the number of disk operations for the one track and the full stride, the ad hoc quantity representative of excess bandwidth usage.

11. The computer program product of claim 9, wherein the one track is the first track in the full stride, and further including an executable portion that, if the predetermined threshold is exceeded, marks the first track in the full stride to be sequential; otherwise resets a sequential bit in the first track.

12. The computer program product of claim of claim 11, further including an executable portion that, if the first track is marked to be sequential, performs a full stride copy source-to-target operation; otherwise performing a copy source-to-target operation for the first track.

* * * * *